US008717938B2

(12) United States Patent
Wang et al.

(10) Patent No.: US 8,717,938 B2
(45) Date of Patent: May 6, 2014

(54) SYSTEM AND METHOD FOR SIGNALING CONFIGURATION OF SOUNDING REFERENCE SIGNALS

(75) Inventors: Yuxin Wang, Shenzhen (CN); Bo Dai, Shenzhen (CN); Peng Hao, Shenzhen (CN); Chunli Liang, Shenzhen (CN); Bin Yu, Shenzhen (CN); Peng Zhu, Shenzhen (CN); Weiwei Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 2 days.

(21) Appl. No.: 13/505,759

(22) PCT Filed: Sep. 20, 2010

(86) PCT No.: PCT/CN2010/077164
§ 371 (c)(1),
(2), (4) Date: May 3, 2012

(87) PCT Pub. No.: WO2011/120284
PCT Pub. Date: Oct. 6, 2011

(65) Prior Publication Data
US 2013/0028134 A1    Jan. 31, 2013

(30) Foreign Application Priority Data

Mar. 31, 2010   (CN) .......................... 2010 1 0155563

(51) Int. Cl.
*H04L 12/28*   (2006.01)
(52) U.S. Cl.
USPC ......................................... 370/254; 370/329
(58) Field of Classification Search
None
See application file for complete search history.

(56) References Cited

U.S. PATENT DOCUMENTS

| 8,565,179 | B2 * | 10/2013 | Noh et al. ............... 370/329 |
| 2011/0171964 | A1 * | 7/2011 | Lin et al. ............... 455/450 |
| 2011/0249648 | A1 * | 10/2011 | Jen ............................ 370/330 |
| 2011/0310818 | A1 * | 12/2011 | Lin et al. ............... 370/329 |

(Continued)

FOREIGN PATENT DOCUMENTS

| CN | 101335969 A | 12/2008 |
| CN | 101547022 A | 9/2009 |

(Continued)

OTHER PUBLICATIONS

"Further Discussions on SRS Enhancements"; Ericsson, ST-Ericsson, 7.4.2, Discussion and Decision; TSG-RAN WG1 #60, San Francisco, USA, Feb. 22-26, 2010, pp. 1-3.

(Continued)

*Primary Examiner* — Robert Wilson
(74) *Attorney, Agent, or Firm* — Ling Wu; Stephen Yang; Ling and Yang Intellectual Property

(57) ABSTRACT

The present invention discloses a method for a signaling configuration of a sounding reference signal. The method includes: a base station notifying a user equipment to aperiodically send the sounding reference signal, and sending configuration information of aperiodically sending the sounding reference signal (SRS) down to the user equipment. The present invention also discloses a base station for a signaling configuration of a sounding reference signal and a user equipment for a signaling configuration of a sounding reference signal. The present invention can realize that the user equipment aperiodically sends the SRS, which improves the utilization ratio of SRS resources and increases the flexibility of resource scheduling.

16 Claims, 4 Drawing Sheets

(56) References Cited

U.S. PATENT DOCUMENTS

| | | | | |
|---|---|---|---|---|
| 2012/0300743 | A1* | 11/2012 | Kim et al. | 370/329 |
| 2013/0028134 | A1* | 1/2013 | Wang et al. | 370/254 |
| 2013/0028138 | A1* | 1/2013 | Hao et al. | 370/254 |
| 2013/0039233 | A1* | 2/2013 | Dai et al. | 370/280 |
| 2013/0044716 | A1* | 2/2013 | Wang et al. | 370/329 |

FOREIGN PATENT DOCUMENTS

| | | |
|---|---|---|
| CN | 101572896 A | 11/2009 |
| CN | 101827444 A | 9/2010 |
| JP | 2011166699 A | 8/2011 |
| WO | 2011108906 A2 | 9/2011 |

OTHER PUBLICATIONS

"Channel sounding enhancements for LTE-Advanced uplink", Nokia Siemens Networks, Nokia, 7.4.2, Discussion and Decision; 3GPP TSG-RAN WG1 #60, San Francisco, USA, Feb. 22-26, 2010, pp. 1-3.

International Search Report for PCT/CN2010/077164 dated Dec. 17, 2010.

"SRS for Carrier Aggregation in LTE-Advanced", Texas Instruments, 7.4.2, Discussion and Decision; 3GPP TSG RAN WG1 #59bis, Valencia, Spain, Jan. 18-22, 2010; R1-100458, XP 50418100A, See pp. 1-4.

"Views on SRS Enhancements for LTE-A", Motorola, 7.4.2, Discussion/Decision; 3GPP TSG RAN WG1 #60, San Francisco, USA, Feb. 22-26, 2010; R1-101134, XP 50418982A, See pp. 1-4.

* cited by examiner

SYSTEM AND METHOD FOR SIGNALING CONFIGURATION OF SOUNDING REFERENCE SIGNALS

TECHNICAL FIELD

The present invention relates to the communication field, and in particular, to a system and method for a signaling configuration of a sounding reference signal (SRS).

BACKGROUND OF THE RELATED ART

The physical uplink channels of the long term evolution (LTE for short) system include a physical random access channel (PRACH for short), a physical uplink shared channel (PUSCH for short) and a physical uplink control channel (PUCCH for short). Wherein, the PUSCH has two different cyclic prefix (CP for short) lengths which are respectively a normal cyclic prefix (Normal CP for short) and an extended cyclic prefix (Extended CP for short). Each sending subframe of the PUSCH is composed of two time slots. For different cyclic prefix lengths, the location of the demodulation reference signal (DMRS for short) in the subframe will be different. FIG. 1 is a schematic diagram of a time domain location of a demodulation reference signal according to the related art. As shown in FIG. 1, each subframe contains two DMRS symbols. FIG. 1 (a) is a schematic diagram of the time domain location of the DMRS when adopting the normal cyclic prefix, each subframe contains 14 orthogonal frequency division multiplexing (OFDM for short) symbols, and the 14 OFDM symbols include the DMRS symbols, wherein, the OFDM symbols represent the time domain location of one subframe; FIG. 1 (b) is a schematic diagram of the time domain location of the DMRS when adopting the extended cyclic prefix, and each subframe contains the OFDM symbols of 12 time domains.

In the LTE system, a physical downlink control channel (PDCCH for short) is used to bear the uplink and downlink scheduled information, and the uplink power control information. A base station (e-Node-B, eNB for short) can configure the user equipment (UE for short) through the downlink control information, or the user equipment accepts the configuration from the higher layers, which is also called as configuring the UE through the high layers signaling. The format of the downlink control information (DCI for short) includes DCI format 0, 1, 1A, 1B, 1C, 1D, 2, 2A, 3 and 3A, etc., wherein, the DCI format 0 is used to indicate scheduling of the PUSCH;

the DCI format 1, 1A, 1B, 1C and 1D are used for different transmission modes of a physical downlink shared channel (PDSCH for short) of a single transport block;

the DCI format 2 and 2A are used for different transmission modes of space division multiplexing of the downlink PDSCH;

the DCI format 3 and 3A are used for transmission of power control instructions of the PUCCH and the PUSCH.

The transport block size of the above-mentioned DCI format 0, 1A, 3 and 3A are same, wherein, the DCI format 0 and 1A adopts 1 bit to distinguish the format.

The format of the DCI format 3 is as follows:

transmission power control command 1, transmission power control command 2, . . . , transmission power control command N, wherein, $$N = \left\lfloor \frac{L_{format\ 0}}{2} \right\rfloor,$$

$L_{format\ 0}$=format 0 plus a bit number before the cyclical redundancy check (CRC for short) (including additional padding bit(s)), and the parameter tpc-Index given by the high layers determines the transmission power control command (TPC command) of the given UE.

If $$\left\lfloor \frac{L_{format\ 0}}{2} \right\rfloor < \frac{L_{format\ 0}}{2},$$

the DCI format 3 will be added 1 bit '0'.

The process of a blind detection of the PDCCH in the LTE system is described as follows briefly, the control channel element (CCE for short) is a minimum element bearing the PDCCH resource, and the control area is composed of a series of CCEs.

The blind detection range of the PDCCH is defined by a search space, and the search space is divided into a public search space and an UE dedicated search space. The search space $S_k^{(L)}$ is defined as:

$$L \cdot \{(Y_k+m) \bmod \lfloor N_{CCE,k}/L \rfloor\}+i,$$

wherein, L is the aggregation grade of the CCE, and L∈{1, 2, 4, 8}; for the public search space, $Y_k$=0, i.e., searching from CCE=0~15; and for the UE dedicated search space, $Y_k$=(A·$Y_{k-1}$)mod D, $Y_{-1}$=$n_{RNTI}$≠0, A=39827, D=65537, k=⌊$n_s$/2⌋, $n_s$ represents the time slot number 0~19. i=0,L, L−1, m=0,L, $M^{(L)}$−1, $M^{(L)}$ is the number of PDCCH candidates after L is given in the search space.

Wherein, the $n_{RNTI}$ represents the radio network temporary identifier (RNTI for short), and $n_{RNTI}$ corresponds to one of the following radio network temporary identifiers:

system information-RNTI (SI-RNTI for short), random access-RNTI (RA-RNTI for short), paging-RNTI (P-RNTI for short), cell-RNTI (C-RNTI for short), semi-persistent scheduling RNTI (SPS-RNTI for short), and temporary cell-RNTI (Temporary C-RNTI).

Which kind of RNTI the $n_{RNTI}$ selects specifically is configured by the high layers signaling, and the specific value is also specified by the corresponding signaling and data. The value of the RNTI refers to the following Table 1. The search space defined according to the aggregation grade is shown in Table 2. When the UE is blind detected, the detection is performed according to the DCI format corresponding to the transmission mode of the downlink. The 16-bit CRC of each downlink control information DCI is scrambled by using the above-mentioned RNTI. Different UEs can configure different RNTIs to perform the scrambling to the CRC, thus it can distinguish the DCI of different UEs.

TABLE 1

RNTI value

| Value (Hex) | | RNTI |
|---|---|---|
| Frequency Division Duplexing (FDD) | Time Division Duplexing (TDD) | |
| 0000-0009 | 0000-003B | Radom access RNTI (RA-RNTI) |
| 000A-FFF2 | 003C-FFF2 | C-RNTI, Semi-Persistent Scheduling C-RNTI, Temporary C-RNTI, TPC-PUCCH-RNTI and TPC-PUSCH-RNTI |
| FFF3-FFFC | | Reserved |
| FFFE | | P-RNTI |
| FFFF | | SI-RNTI |

TABLE 2 the PDCCH candidates monitored by UE

| | Search space $S_k^{(L)}$ | | The number of PDCCH candidates $M^{(L)}$ |
|---|---|---|---|
| Type | Aggregation grade L | Size [CCEs] | |
| UE dedicated | 1 | 6 | 6 |
| | 2 | 12 | 6 |
| | 4 | 8 | 2 |
| | 8 | 16 | 2 |
| Public | 4 | 16 | 4 |
| | 8 | 16 | 2 |

In the LTE system, the multiplexing process of the DCI is shown in FIG. 2. Every DCI corresponds to one medium access control identifier (MAC id), i.e., corresponds to one RNTI. The original information bit of the DCI is added with the CRC scrambled by the RNTI, and then performed channel coding and rate matching, thus a plurality of DCIs of the PDCCH are multiplexed together. System information (SI for short) performs the resource allocation through the DCI format 1A/1C. The blind detection of the SI is only performed in the public search space, and the CRC of the DCI of the SI is scrambled by adopting the unique SI-RNTI.

The broadcast information of the LTE system is divided into a master information block (MIB for short) and a system information block (SIB for short), wherein, the MIB is transmitted on the physical broadcast channel (PBCH for short), and the SIB is transmitted on the PDSCH (also called scheduled information (SI)).

The SRS is a signal used for measuring radio channel state information (CSI for short) between the user equipment and the base station. In the long term evolution system, the UE sends an uplink SRS in the last data symbol of the sent subframe regularly according to parameters, such as the bandwidth, the frequency domain location, the sequence cyclic shift, the period and the subframe offset, etc., instructed by the eNB. The eNB judges the UE uplink CSI according to the received SRS, and performs operations, such as frequency domain selection scheduling and closed-loop power control, etc., according to the obtained CSI.

In the LTE system, an SRS sequence sent by the UE is obtained by performing the cyclic shift α in time domain to one root sequence $\bar{r}_{u,v}(n)$. Different SRS sequences can be obtained by performing different cyclic shifts α to the same root sequence, and these obtained SRS sequences are mutual orthogonal. Therefore, these SRS sequences can be allocated to different UEs for using, to realize the code division multiple access among the UEs. In the LTE system, the SRS sequence defines 8 cyclic shifts α, which is provided through the following formula (1):

$$\alpha = 2\pi \frac{n_{SRS}^{cs}}{8} \qquad \text{Formula (1)}$$

wherein, $n_{SRS}^{cs}$ is indicated by signaling of 3-bit, as 0, 1, 2, 3, 4, 5, 6 and 7 respectively. That is to say, with the same time-frequency resource, the UE in the cell has 8 available code resources, and the eNB can configure at most 8 UEs to send the SRS at the same time on the same time-frequency resource. Formula (1) can be regarded as dividing the SRS sequence into 8 pieces with same interval in the time domain, however, since the length of the SRS sequence is a multiple of 12, so the minimum length of the SRS sequence is 24.

In the LTE system, the frequency domain bandwidth of the SRS adopts a tree structure to configure. Every SRS bandwidth configuration corresponds to one tree structure, and the SRS-Bandwidth on the highest layer (or called the first layer) corresponds to the maximum SRS bandwidth of the SRS bandwidth configuration, or is called as the SRS bandwidth range. The UE calculates and obtains its own SRS bandwidth according to the signaling indication of the base station, and then determines a frequency domain initial position for sending the SRS by itself according to an upper layer signaling frequency domain location $n_{RRC}$ sent by the eNB. FIG. 3 is a schematic diagram of a frequency domain initial position of a UE allocated with different $n_{RRC}$ sending the SRS in the related art. As shown in FIG. 3, the UE allocated with different $n_{RRC}$ will send the SRS in different areas of the SRS bandwidth of the cell, wherein, the UE1 determines the frequency initial position to send the SRS according to $n_{RRC}=0$, the UE2 determines the frequency initial position to send the SRS according to $n_{RRC}=3$, the UE3 determines the frequency initial position to send the SRS according to $n_{RRC}=4$, and the UE4 determines the frequency initial position to send the SRS according to $n_{RRC}=6$.

The sequence used by the SRS is selected from a demodulation pilot frequency sequence group. When the SRS bandwidth of the UE is 4 resource blocks (RB for short), it uses a computer generated (CG for short) sequence with the length being 2 RBs; and when the SRS bandwidth of the UE is larger than 4 RBs, it uses a Zadoff-Chu sequence with the corresponding length.

In addition, in the same SRS bandwidth, the sub-carrier of the SRS is placed with intervals, that is to say, sending of the SRS adopts a comb structure. The number of the frequency comb in the LTE system is 2, which also corresponds to the repetition factor (RPF for short) of the time domain of 2. FIG. 4 is a schematic diagram of a comb structure of the SRS in the related art. As shown in FIG. 4, when each UE sends the SRS, only one of the two frequency combs is used, comb=0 or comb=1. In this way, the UE, according to the location indication of the frequency comb (comb=0 or comb=1) of 1-bit upper layer signaling, only uses the sub-carrier with frequency domain index being the even number or odd number to send the SRS. This comb structure allows more UEs to send the SRS in the same SRS bandwidth.

In the same SRS bandwidth, a plurality of UEs can use different cyclic shifts in the same frequency comb, and then sends the SRS through the code division multiplexing; and also two UEs send the SRS in different frequency combs through the frequency division multiplexing. For example, in the LTE system, for the UE sending the SRS in a certain SRS bandwidth (4 RBs), cyclic shifts able to be used by the UE are 8 and frequency combs able to be used by the UE are 2, thus the UE has 16 resources that can be used for sending the SRS, that is to say, in that SRS bandwidth, at most 16 SRSs can be sent at the same time. Since the LTE system does not support single user multiple input multiple output (SU-MIMO for short), the UE can only have one antenna to send the SRS at every moment; so one UE only needs one SRS resource. Therefore, in the above-mentioned SRS bandwidth, the system at most can multiplex 16 UEs at the same time.

The LTE-Advanced (LTE-A for short) system is the next generation evolved system of the LTE system, supports the SU-MIMO in the uplink, and can use at most 4 antennas as uplink transmitting antennas. That is to say, the UE can simultaneously send the SRS on a plurality of antennas at the same moment, while the eNB needs to estimate the state on each channel according to the SRS received on each antenna.

In the case of the LTE-A carrier aggregation, a variety of carrier types are introduced. The LTE-A carrier types can be divided into three types: backwards compatible carrier, non-backwards compatible carrier and extension carrier.

The extension carrier has two kinds of meanings: 1) as a part of component carrier (CC for short); 2) as an independent component carrier. The extension carrier cannot work alone, and must be a part of a group of component carrier set; and at least one of the component carriers in the set can work alone. The extension carrier is invisible for the LTE UEs.

In order to design simply, and considering various possible application scenarios, the extension carrier is most likely configured to have no PDCCH. Then the DCI corresponding to the system information of the extension carrier needs to be sent on other component carriers. Besides, the LTE-A has also introduced the concept of resident carrier, that is, the carrier accessed by the UE initially, and after the access succeeds, it can reconfigure the resident carrier for the UE through the high layers signaling, to guarantee load balancing.

In the case of the LTE-A carrier aggregation, a PDCCH component carrier set (PDCCH CC set) is defined, and the UE needs to perform the blind detection in the PDCCH CC set; a downlink component carrier set (DL CC set for short) is defined also, and the PDSCH of the UE can be sent on any CC in the DL CC set. In the case of the LTE-A carrier aggregation, cross carrier scheduling is allowed, that is, the PDCCH on a certain component carrier can schedule the PDSCH or the PUSCH on a plurality of component carriers.

It is proposed in the existing research of the LTE-A that: in the uplink communication, the non-precoding (i.e., antenna-dedicated) SRS should be used, while the precoding is performed to the DMRS of the PUSCH. The base station, by receiving the non-precoding SRS, can estimate the uplink original CSI, but the base station cannot estimate the uplink original CSI through the precoding DMRS. At the moment, when the UE uses multi-antenna to send the non-precoding SRS, the SRS resource required by each UE will increase, which causes the number of the UEs which can be multiplexed in the system at the same time to decrease. In addition, except keeping the original periodic of the LTE to send SRS, in order to improve the utilization rate of the SRS resource and enhance the flexibility of resource scheduling, the UE aperiodically sending the SRS can also be configured through the downlink control information or the high layers signaling. Therefore, there are the periodic SRS and the aperiodic SRS in the LTE-A system, and how to reasonably design the downlink control information or the high layers signaling to configure the SRS resource, to realize aperiodically sending the SRS effectively and timely, save the signaling overhead and reduce the complexity of the UE blind detection at the same time, is a problem to be solved.

CONTENT OF THE INVENTION

In order to solve the above-mentioned technical problem, the present invention provides a system and method for a signaling configuration of a sounding reference signal, which can solve the problem that the related art cannot realize that the UE aperiodically sends the SRS.

The present invention provides a method for a signaling configuration of a sounding reference signal, comprising:

a base station notifying a user equipment to aperiodically send the sounding reference signal, and sending configuration information of aperiodically sending the sounding reference signal (SRS) down to the user equipment.

The step of sending the configuration information of aperiodically sending the sounding reference signal down to the user equipment comprises:

the base station sending the configuration information of aperiodically sending the sounding reference signal down to one or more user equipment through a physical downlink shared channel (PDSCH).

The scheduled information of the PDSCH is born by a downlink control information format 1A or format 1C, and a cyclic redundancy check (CRC) of the downlink control information format is scrambled by using a sounding reference signal-radio network temporary identifier (SRS-RNTI);

wherein, the control information format is the format 1A or the format 1C; and the SRS-RNTI is a public radio network temporary identifier (RNTI) or a user dedicated RNTI.

When scrambling the CRC of the downlink control information format 1A or format 1C by using the user dedicated RNTI, the downlink control information format is sent on a public or dedicated search space;

when scrambling the CRC of the downlink control information format 1A or format 1C by using the public RNTI, the downlink control information format is sent on a public search space.

When scrambling the CRC of the downlink control information format by using the user dedicated RNTI, a data block of the PDSCH comprises a data packet of the user equipment corresponding to the user dedicated RNTI, and the data packet at least comprises the configuration information of aperiodically sending the sounding reference signal of the user equipment;

when scrambling the CRC of the downlink control information format by using the public RNTI, a data block of the PDSCH comprises data packet(s) of one or more user equipments, and the data packet of each user equipment at least comprises the configuration information of aperiodically sending the sounding reference signal of the user equipment and RNTI information dedicated by the user equipment.

The method further comprises:

when scrambling the CRC of the downlink control information format by using the public RNTI, the user equipment blindly detecting the downlink control information format scrambled by using the public RNTI on the corresponding search space; when detecting the downlink control information format, according to the scheduled information born by the downlink control information format, obtaining the PDSCH in a corresponding location; if a transport block born by the PDSCH contains the RNTI dedicated by the user equipment, then judging needing to aperiodically send the sounding reference signal, and aperiodically sending according to the corresponding configuration information; and if a transport block born by the PDSCH does not contain the RNTI dedicated by the user equipment, then continuing to blindly detect the data of a next subframe;

when scrambling the CRC of the downlink control information format by using the user dedicated RNTI, the user equipment blindly detecting the downlink control information format scrambled by using the user dedicated RNTI on the corresponding search space; if the user equipment blindly detects the downlink control information format scrambled by using the user dedicated RNTI on the corresponding search space, then judging needing to aperiodically send the sounding reference signal, and aperiodically sending according to the corresponding configuration information; and if the user equipment does not blindly detect the downlink control information format scrambled by using the user dedicated RNTI on the corresponding search space, then continuing to blindly detect the data of the next subframe.

The configuration information of aperiodically sending the sounding reference signal carried by the PDSCH comprises one or more of the following information: cyclic shift information, a frequency domain location, an uplink component carrier index, a bandwidth, a location of a frequency comb, a mode indication of sending the sounding reference signal and the number of sending times.

When the configuration information does not contain the uplink component carrier index, an uplink component carrier of the user equipment aperiodically sending the sounding reference signal is an uplink component carrier corresponding to a downlink component carrier where the PDSCH bearing the configuration information locates, or is an uplink component carrier indicated by a high layers signaling or other downlink control information format;

when the configuration information contains a plurality of uplink component carrier indexes, an uplink component carrier of the user equipment aperiodically sending the sounding reference signal is an uplink component carrier corresponding to a downlink component carrier where the PDSCH bearing the configuration information locates, or is a plurality of uplink component carriers corresponding to a plurality of uplink component carrier indexes, that is, aperiodically sending the sounding reference signal on a plurality of uplink component carriers.

The step of sending the configuration information of aperiodically sending the sounding reference signal down to the user equipment comprises:

the base station carrying an indication information of aperiodically sending the sounding reference signal of the user equipment through a downlink control information, and configuring N resources or ways used for aperiodically sending the sounding reference signal for the user equipment through a high layers signaling;

wherein, N is an integer from 1 to 20.

Each resource or way in the N resources or ways comprises one or more of the following information:

a cyclic shift information, a frequency domain location, a user dedicated bandwidth, a location of a frequency comb, an SRS bandwidth configuration information, an SRS sending subframe, a periodic configuration information and a mode indication of sending the sounding reference signal.

For each equipment, when the user equipment occupies one uplink component carrier, k-bit is used to represent the indication information of aperiodically sending the sounding reference signal in the downlink control information, wherein the indication information indicates whether the equipment needs to aperiodically send the sounding reference signal on the corresponding uplink component carrier and which one of the N resources and ways is used to perform the sending;

when the user equipment occupies a plurality of uplink component carriers, the indication information of aperiodically sending the sounding reference signal on each uplink component carrier is indicated according to any one of the following ways:

(a) k-bit is used to represent the indication information of aperiodically sending the sounding reference signal in the downlink control information, wherein the indication information indicates whether the equipment needs to aperiodically send the sounding reference signal and which one of the N resources or ways is used to perform the sending, and when aperiodically sending the sounding reference signal on each uplink component carrier, the aperiodically sending the sounding reference signal is performed according to the indication information of k-bit;

(b) for each uplink component carrier, different indication information is used to indicate respectively, and each indication information is represented by a k-bit signaling, wherein the k-bit signaling indicates whether the equipment needs to aperiodically send the sounding reference signal on the corresponding uplink component carrier and which one of the N resources or ways is used to perform the sending;

wherein, k is an integer from 1 to 6.

A relationship between k and N is: $k=\text{ceil}(\log_2(N+1))$, and the ceil represents rounded up.

The indication information of aperiodically sending the sounding reference signal is born in a user dedicated downlink control information format (DCI Format) domain, or born in a DCI Format domain dedicated to bearing aperiodic sounding reference signal information.

The method further comprises:

when the indication information of aperiodically sending the sounding reference signal of a same user equipment is born in the user dedicated DCI Format and the DCI Format dedicated for bearing the aperiodic sounding reference signal information in one subframe, the user equipment analyzing the indication information of aperiodically sending the sounding reference signal born in the user dedicated DCI Format.

The user dedicated DCI Format comprises the user dedicated DCI Format used for uplink scheduling and the user dedicated DCI Format used for downlink allocation;

when the indication information of aperiodically sending the sounding reference signal of a same user equipment is born in the user dedicated DCI Format used for uplink scheduling and the user dedicated DCI Format used for downlink allocation in one subframe, the user equipment analyzes the indication information of aperiodically sending the sounding reference signal of the user equipment born by any one of the user dedicated DCI Formats.

When the indication information of aperiodically sending the sounding reference signal of a same user equipment is born in the user dedicated DCI Format and the DCI Format dedicated for bearing the aperiodic sounding reference signal information in one subframe, the indication information born in the user dedicated DCI Format and the indication information born in the DCI Format dedicated for bearing the aperiodic sounding reference signal information are configured as the same value.

The DCI Format dedicated for bearing the aperiodic sounding reference signal information scrambles a cyclic redundancy check (CRC) of the downlink control information format by using a public RNTI or a dedicated RNTI.

When the indication information of aperiodically sending the sounding reference signal is born in the user dedicated DCI Format domain, a cyclic redundancy check (CRC) of the DCI Format is scrambled by using the user dedicated RNTI;

when the indication information of aperiodically sending the sounding reference signal is born in the DCI Format domain dedicated for bearing the aperiodic sounding reference signal information, if the DCI Format contains the indication information of aperiodically sending the sounding reference signals of a plurality of user equipments, then a cyclic redundancy check (CRC) of the DCI Format is scrambled by using a public RNTI; and if the DCI Format only contains the indication information of aperiodically sending the sounding reference signal of one user equipment, then a cyclic redundancy check (CRC) of the DCI Format is scrambled by using a public RNTI or a dedicated RNTI.

When the DCI Format dedicated for bearing the aperiodic sounding reference signal information is adopted to bear the indication information of aperiodically sending the sounding reference signals of a plurality of user equipments, an arranging sequence or an initial location of the indication information of aperiodically sending the sounding reference signals of a plurality of user equipments is configured through the high layers signaling and sent to each user equipment.

The uplink component carrier is determined by a public RNTI and an initial location, wherein, different uplink component carriers correspond to different public RNTIs or initial locations.

The uplink component carrier is an uplink component carrier corresponding to a downlink component carrier where the PDSCH scheduled by the DCI format bearing the indication information locates, or, an uplink component carrier where the PUSCH scheduled by the DCI format bearing the indication information locates, or, an uplink component carrier corresponding to a downlink component carrier bearing the indication information.

The step of sending the configuration information of aperiodically sending the sounding reference signal down to the user equipment comprises:

the base station, when sending a downlink control information down, indicating the user equipment whether to perform aperiodically sending the sounding reference signal and a mode of aperiodically sending the sounding reference signal; and configuring and sending down other parameters required by aperiodically sending the sounding reference signal through a high layers signaling.

The user equipment is indicated whether needing to aperiodically send the sounding reference signal by using 1-bit; and supposing that the number of modes used for aperiodically sending the sounding reference signal in one uplink subframe is T, the mode of aperiodically sending the sounding reference signal is indicated by using n-bit;

wherein, n=ceil($\log_2 T$), ceil represents rounded up, and T and n are integers from 1 to 6.

The user equipment is indicated whether needing to perform aperiodically sending the SRS and a mode of aperiodically sending the SRS by using m-bit;

the number of modes used for aperiodically sending the sounding reference signal in one uplink subframe is supposed to be T;

wherein, m=ceil($\log_2(T+1)$),m is an integer from 1 to 6.

The mode of aperiodically sending the sounding reference signal comprises one or more of the following items: sending the aperiodic sounding reference signal in the last orthogonal frequency division multiplexing (OFDM) symbol of the uplink subframe; sending the aperiodic sounding reference signal in the last but one OFDM symbol of the uplink subframe; not precoding a demodulation reference signal (DMRS) of the first time slot of the uplink subframe and/or a DMRS of the second time slot of the uplink subframe; sending the aperiodic sounding reference signal in the last one and/or the last but one OFDM symbol of the uplink subframe, and wherein, a sending bandwidth equals to a bandwidth occupied by a physical uplink shared channel (PUSCH) of the user equipment, and a frequency domain location of sending is the same as a frequency domain location of the PUSCH; and sending the sounding reference signal in the DMRS of the first time slot of the uplink subframe and the DMRS of the second time slot of the uplink subframe at the same time, and performing a code division multiplexing to the sent sounding reference signal and an uplink demodulation reference signal by adopting an orthogonal cover code.

When the user equipment determines to send the SRS by adopting the mode of not precoding the DMRS of the first time slot and/or the DMRS of the second time slot, the user equipment does not perform the precoding to the DMRS of the corresponding time slot;

when the user equipment sending the SRS on the DMRS of the first time slot and the DMRS of the second time slot at the same time, the user equipment performs the code division multiplexing to the sent SRS and the uplink demodulation reference signal by adopting the orthogonal cover code, wherein the orthogonal cover code is: [+1, +1] or [+1, −1].

The present invention provides a base station for a signaling configuration of a sounding reference signal, configured to:

notify a user equipment to send an aperiodic sounding reference signal, and send configuration information of sending the sounding reference signal down to the user equipment, so as to make the user equipment aperiodically sound a reference signal on a corresponding uplink component carrier.

The base station is configured to send the configuration information of sending the sounding reference signal down to the user equipment according to the following way: the base station sending the configuration information of aperiodically sending the sounding reference signal down to one or more user equipment through a physical downlink shared channel (PDSCH); or the base station is configured to send the configuration information of sending the sounding reference signal down to the user equipment according to the following way: the base station carrying an indication information of aperiodically sending the sounding reference signal of the user equipment through a downlink control information, and configuring N resources or ways used for aperiodically sending the sounding reference signal for the user equipment through a high layers signaling; or the base station is configured to send the configuration information of sending the sounding reference signal down to the user equipment according to the following way: the base station, when sending a downlink control information, indicating the user equipment whether to perform aperiodically sending the sounding reference signal and a mode of aperiodically sending the sounding reference signal; and configuring and sending other parameters required by aperiodically sending the sounding reference signal through a high layers signaling.

The present invention provides a user equipment for a signaling configuration of a sounding reference signal, configured to:

receive a notification of sending an aperiodic sounding reference signal sent by a base station, receive configuration information of sending the aperiodic sounding reference signal down to the user equipment sent by the base station, and aperiodically sound a reference signal on a corresponding uplink component carrier.

In conclusion, with the technical scheme of the present invention, it is possible to realize that the user equipment aperiodically sends the SRS, which improves the utilization ratio of SRS resources and increases the flexibility of resource scheduling.

PREFERRED EMBODIMENTS OF THE PRESENT INVENTION

Figure 1:
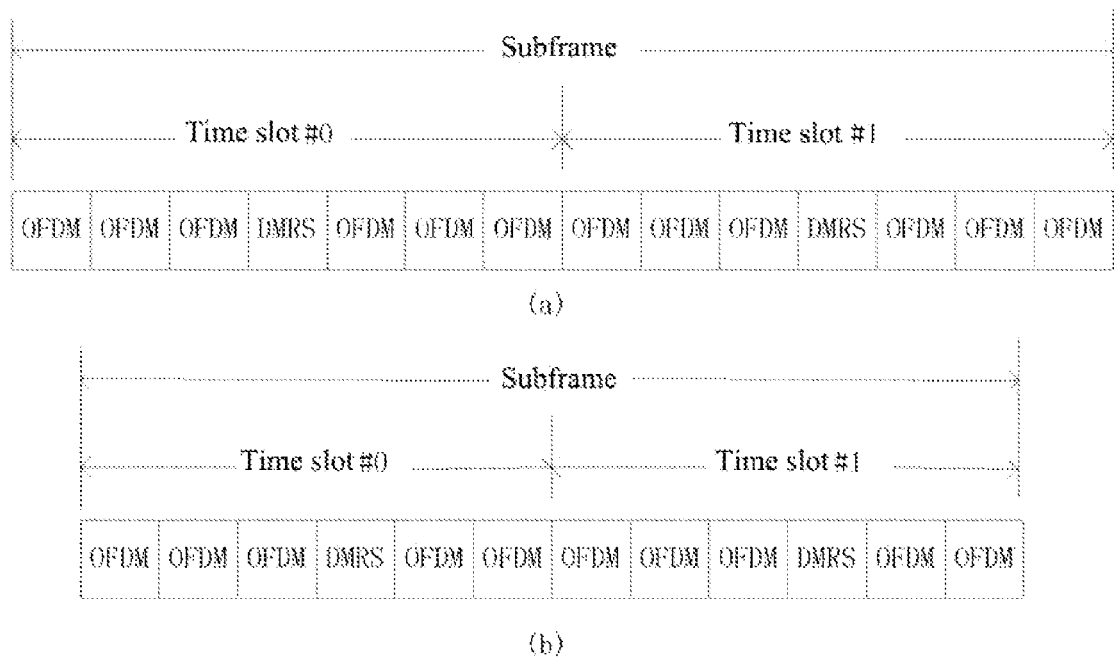
FIG. 1 is a schematic diagram of a time domain location of a demodulation reference signal in the related art.
Figure 2:
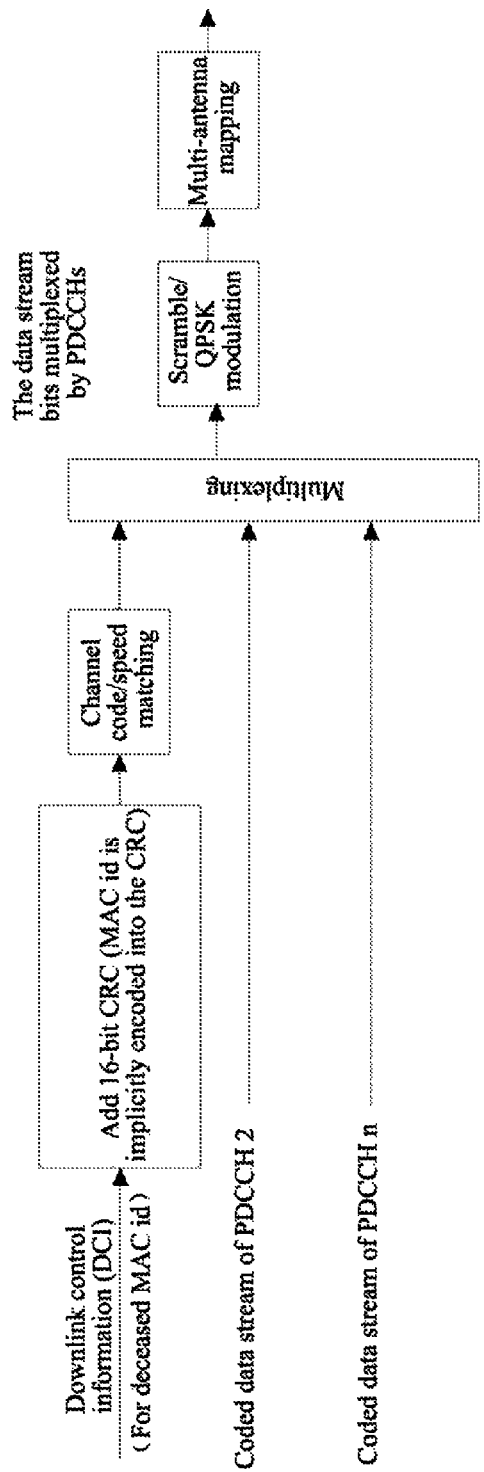
FIG. 2 is a schematic diagram of a multiplexing process of a PDCCH DCI.
Figure 3:
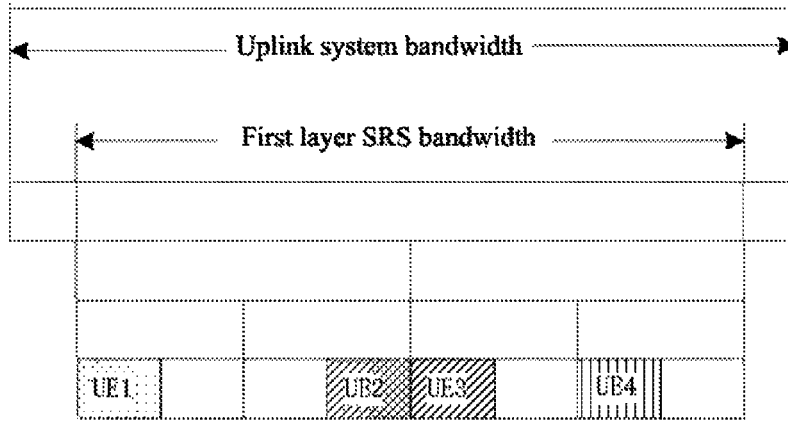
FIG. 3 is a schematic diagram of frequency domain initial positions for sending SRSs by UEs allocated with different $n_{RRC}$ in the related art.
Figure 4:
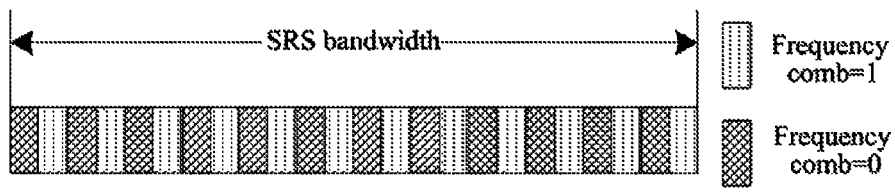
FIG. 4 is a schematic diagram of a comb structure of an SRS in the related art.

The present invention provides a system for a signaling configuration of a sounding reference signal, including a base station and a user equipment;

the base station is configured to notify the user equipment to send the aperiodic sounding reference signal, and send the configuration information of sending the sounding reference signal down to the user equipment; and the user equipment is configured to aperiodically sound a reference signal on a corresponding uplink component carrier.

The base station can, but not limit to, send the configuration information of sending the sounding reference signal down to the user equipment through any one of the following ways:

(A) the base station sends the configuration information of aperiodically sending the sounding reference signal down to one or more user equipment through a PDSCH.

The scheduled information of the PDSCH is born by a downlink control information format, format 1A or format 1C, and a cyclic redundancy check (CRC) of the downlink control information format, format 1A or format 1C, is scrambled by using a sounding reference signal-radio network temporary identifier (SRS-RNTI);

wherein, the SRS-RNTI can use a reserved RNTI in Table 1, which is used to perform the scrambling to the cyclic redundancy check (CRC) of the downlink control information format.

The SRS-RNTI is a public RNTI or a user dedicated RNTI.

When scrambling the CRC of the downlink control information format by using the user dedicated RNTI, the downlink control information format is sent on a public or dedicated search space;

when scrambling the CRC of the downlink control information format by using the public RNTI, the downlink control information format is sent on a public search space.

When scrambling the CRC of the downlink control information format by using the user dedicated RNTI, a data block of the PDSCH comprises a data packet of the user equipment corresponding to the user dedicated RNTI, and the data packet at least comprises the configuration information of aperiodically sending the sounding reference signal of the user equipment;

when scrambling the CRC of the downlink control information format by using the public RNTI, a data block of the PDSCH comprises data packet(s) of one or more user equipments, and the data packet of each user equipment at least comprises the configuration information of aperiodically sending the sounding reference signal of the user equipment and RNTI information dedicated by the user equipment.

When scrambling the CRC of the downlink control information format by using the public RNTI, the user equipment blindly detects the downlink control information format scrambled by using the public RNTI on the corresponding search space; when detecting the downlink control information format, according to the scheduled information born by the downlink control information format, obtains the PDSCH in a corresponding location; if a transport block born by the PDSCH contains the RNTI dedicated by the user equipment, then it is judged needing to aperiodically send the sounding reference signal, and aperiodically sends according to the corresponding configuration information; and otherwise, continues to blindly detect the data of a next subframe;

when scrambling the CRC of the downlink control information format by using the user dedicated RNTI, if the user equipment blindly detects the downlink control information format scrambled by using the user dedicated RNTI on the corresponding search space, then it is judged needing to aperiodically send the sounding reference signal and performs the aperiodically sending according to the corresponding configuration information; and otherwise, it continues to blindly detect the data of the next subframe.

The configuration information of aperiodically sending the sounding reference signal carried by the PDSCH comprises one or more of the following information: cyclic shift information, a frequency domain location, an uplink component carrier index, a bandwidth, a location of a frequency comb, a mode indication of sending the sounding reference signal and the number of sending times.

When the configuration information does not contain the uplink component carrier index, an uplink component carrier of the user equipment aperiodically sending the sounding reference signal is an uplink component carrier corresponding to a downlink component carrier where the PDSCH bearing the configuration information locates, or is an uplink component carrier indicated by a high layers signaling or other downlink control information format;

when the configuration information contains a plurality of uplink component carrier indexes, an uplink component carrier of the user equipment aperiodically sending the sounding reference signal is an uplink component carrier corresponding to a downlink component carrier where the PDSCH bearing the configuration information locates, or is a plurality of uplink component carriers corresponding to a plurality of uplink component carrier indexes, that is, aperiodically sending the sounding reference signal on a plurality of uplink component carriers.

(B) the base station carries an indication information of aperiodically sending the sounding reference signal of the user equipment through a downlink control information, and configures N resources or ways used for aperiodically sending the sounding reference signal for the user equipment through a high layers signaling;

wherein, N is an integer from 1 to 20.

Each resource or way in the N resources or ways comprises one or more of the following information:

a cyclic shift information, a frequency domain location, a user dedicated bandwidth, a location of a frequency comb, an SRS bandwidth configuration information, an SRS sending subframe, a periodic configuration information and a mode indication of sending the sounding reference signal.

For each equipment, when the user equipment occupies one uplink component carrier, k-bit is used to represent the indication information of aperiodically sending the sounding reference signal in the downlink control information, wherein the indication information indicates whether the equipment needs to aperiodically send the sounding reference signal on the corresponding uplink component carrier and which one of the N resources and ways is used to perform the sending;

when the user equipment occupies a plurality of uplink component carriers, the indication information of aperiodically sending the sounding reference signal on each uplink component carrier is indicated according to any one of the following ways:

(a) k-bit is used to represent the indication information of aperiodically sending the sounding reference signal in the downlink control information, wherein the indication information indicates whether the equipment needs to aperiodically send the sounding reference signal and which one of the N resources or ways is used to perform the sending, and when aperiodically sending the sounding reference signal on each uplink component carrier, the aperiodically sending the sounding reference signal is performed according to the indication information of k-bit;

(b) for each uplink component carrier, different indication information is used to indicate respectively, and each indication information is represented by a k-bit signaling, wherein the k-bit signaling indicates whether the equipment needs to aperiodically send the sounding reference signal on the corresponding uplink component carrier and which one of the N resources or ways is used to perform the sending;

wherein, k is an integer from 1 to 6.

The relationship between k and N is: $k=ceil(\log_2(N+1))$, and the ceil represents rounded up.

The indication information of aperiodically sending the sounding reference signal is born in a user dedicated DCI Format domain, or born in a DCI Format domain dedicated to bearing aperiodic sounding reference signal information.

When the indication information of aperiodically sending the sounding reference signal of a same user equipment is born in the user dedicated DCI Format and the DCI Format dedicated for bearing the aperiodic sounding reference signal information in one subframe, the user equipment analyzing the indication information of aperiodically sending the sounding reference signal born in the user dedicated DCI Format.

The user dedicated DCI Format comprises the user dedicated DCI Format used for uplink scheduling and the user dedicated DCI Format used for downlink allocation;

when the indication information of aperiodically sending the sounding reference signal of a same user equipment is born in the user dedicated DCI Format used for uplink scheduling and the user dedicated DCI Format used for downlink allocation in one subframe, the user equipment analyzes the indication information of aperiodically sending the sounding reference signal of the user equipment born by any one of the user dedicated DCI Formats.

When the indication information of aperiodically sending the sounding reference signal of a same user equipment is born in the user dedicated DCI Format and the DCI Format dedicated for bearing the aperiodic sounding reference signal information in one subframe, the indication information born in the user dedicated DCI Format and the indication information born in the DCI Format dedicated for bearing the aperiodic sounding reference signal information are configured as the same value.

The DCI Format dedicated for bearing the aperiodic sounding reference signal information scrambles a cyclic redundancy check (CRC) of the downlink control information format by using a public RNTI or a dedicated RNTI.

When the indication information of aperiodically sending the sounding reference signal is born in the user dedicated DCI Format domain, a cyclic redundancy check (CRC) of the DCI Format is scrambled by using the user dedicated RNTI;

when the indication information of aperiodically sending the sounding reference signal is born in the DCI Format domain dedicated for bearing the aperiodic sounding reference signal information, if the DCI Format contains the indication information of aperiodically sending the sounding reference signals of a plurality of user equipments, then a cyclic redundancy check (CRC) of the DCI Format is scrambled by using a user public RNTI; and if the DCI Format only contains the indication information of aperiodically sending the sounding reference signal of one user equipment, then a cyclic redundancy check (CRC) of the DCI Format is scrambled by using a user public RNTI or dedicated RNTI.

When the DCI Format dedicated for bearing the aperiodic sounding reference signal information is adopted to bear the indication information of aperiodically sending the sounding reference signals of a plurality of user equipments, an arranging sequence or an initial location of the indication information of aperiodically sending the sounding reference signals of a plurality of user equipments is configured through the high layers signaling and sent to each user equipment.

The uplink component carrier is determined by a public RNTI and an initial location, wherein, different uplink component carriers correspond to different public RNTIs or initial locations.

The uplink component carrier is an uplink component carrier corresponding to a downlink component carrier where the PDSCH scheduled by the DCI format bearing the indication information locates, or, an uplink component carrier where the PUSCH scheduled by the DCI format bearing the indication information locates, or, an uplink component carrier corresponding to a downlink component carrier bearing the indication information.

(C) the base station, when sending a downlink control information down, indicating the user equipment whether to perform aperiodically sending the sounding reference signal and a mode of aperiodically sending the sounding reference signal; and configuring and sending down other parameters required by aperiodically sending the sounding reference signal through a high layers signaling.

The user equipment is indicated whether needing to aperiodically send the sounding reference signal by using 1-bit; and supposing that the number of modes used for aperiodically sending the sounding reference signal in one uplink subframe is T, the mode of aperiodically sending the sounding reference signal is indicated by using n-bit;

wherein, $n=ceil(\log_2 T)$, ceil represents rounded up, and T and n are integers from 1 to 6.

The user equipment is indicated whether needing to perform aperiodically sending the SRS and a mode of aperiodically sending the SRS by using m-bit;

the number of modes used for aperiodically sending the sounding reference signal in one uplink subframe is supposed to be T;

wherein, $m=ceil(\log_2(T+1))$, m is an integer from 1 to 6.

In the above ways (A), (B) and (C), the mode of aperiodically sending the sounding reference signal comprises one or more of the following items: sending the aperiodic sounding reference signal in the last OFDM symbol of the uplink subframe; sending the aperiodic sounding reference signal in the last but one OFDM symbol of the uplink subframe; not precoding a DMRS of the first time slot of the uplink subframe and/or a DMRS of the second time slot of the uplink subframe; sending the aperiodic sounding reference signal in the last one and/or the last but one OFDM symbol of the uplink subframe, and wherein, a sending bandwidth equals to a bandwidth occupied by a PUSCH of the user equipment, and a frequency domain location of sending is the same as a frequency domain location of the PUSCH; and sending the sounding reference signal in the DMRS of the first time slot of the uplink subframe and the DMRS of the second time slot of the uplink subframe at the same time, and performing a code division multiplexing to the sent sounding reference signal and an uplink demodulation reference signal by adopting an orthogonal mask.

When the user equipment determines to send the SRS by adopting the mode of not precoding the DMRS of the first time slot and/or the DMRS of the second time slot, the user equipment does not perform the precoding to the DMRS of the corresponding time slot;

when the user equipment sending the SRS on the DMRS of the first time slot and the DMRS of the second time slot at the same time, the user equipment performs the code division multiplexing to the sent SRS and the uplink demodulation reference signal by adopting the orthogonal mask, wherein the orthogonal mask is: [+1, +1] or [+1, −1].

The present invention provides a base station for a signaling configuration of a sounding reference signal, configured to:

notify a user equipment to send an aperiodic sounding reference signal, and send configuration information of sending the sounding reference signal down to the user equipment, so as to make the user equipment aperiodically sound a reference signal on a corresponding uplink component carrier.

The base station is configured to send the configuration information of sending the sounding reference signal down to the user equipment according to the following way:

the base station sending the configuration information of aperiodically sending the sounding reference signal down to one or more user equipment through a physical downlink shared channel (PDSCH).

The base station is configured to send the configuration information of sending the sounding reference signal down to the user equipment according to the following way:

the base station carrying an indication information of aperiodically sending the sounding reference signal of the user equipment through a downlink control information, and configuring N resources or ways used for aperiodically sending the sounding reference signal for the user equipment through a high layers signaling.

The base station is configured to send the configuration information of sending the sounding reference signal down to the user equipment according to the following way:

the base station, when sending a downlink control information, indicating the user equipment whether to perform aperiodically sending the sounding reference signal and a mode of aperiodically sending the sounding reference signal; and configuring and sending other parameters required by aperiodically sending the sounding reference signal through a high layers signaling.

The present invention provides a user equipment for a signaling configuration of a sounding reference signal, configured to:

receive a notification of sending an aperiodic sounding reference signal sent by a base station, receive configuration information of sending the aperiodic sounding reference signal down to the user equipment sent by the base station, and aperiodically sound a reference signal on a corresponding uplink component carrier.

The present invention provides a method for a signaling configuration of a sounding reference signal, in which, a base station notifies a user equipment to send the aperiodic sounding reference signal, and sends the configuration information of sending the sounding reference signal down to the user equipment.

The scheme of the present invention is illustrated in detail through a plurality of embodiments hereinafter.

Embodiment 1

Figure 5:
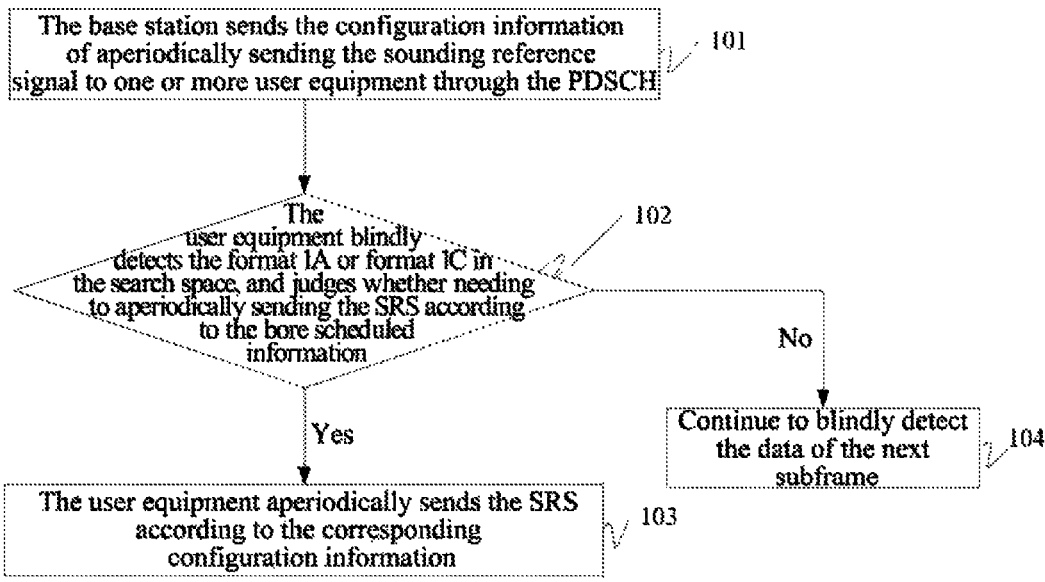
FIG. 5 is a flow chart corresponding to a method embodiment 1 of the present invention.

As shown in FIG. 5, the following steps are included.

In step 101, the base station sends the configuration information of aperiodically sending the sounding reference signal down to one or more user equipment through the PDSCH;

specifically, the scheduled information of the PDSCH is born by a downlink control information format, format 1A or format 1C, and a cyclic redundancy check (CRC) of the downlink control information format, format 1A or format 1C, is scrambled by using an SRS-RNTI; and the above-mentioned SRS-RNTI is a public RNTI or a user dedicated RNTI.

When scrambling the CRC by using the public RNTI, a data block of the PDSCH carrying the configuration information of aperiodically sending the sounding reference signal includes the data packet(s) of one or more user equipments, and the data packet of each user equipment at least includes the configuration information of aperiodically sending the sounding reference signal of the user equipment and the RNTI information dedicated by the user equipment; now, the format 1A or format 1C bearing the PDSCH is sent in a public search space; and when scrambling the CRC by using the user dedicated RNTI, a data block of the PDSCH carrying the configuration information of aperiodically sending the sounding reference signal includes a data packet of the user equipment corresponding to the user dedicated RNTI, and the data packet at least includes the configuration information of aperiodically sending the sounding reference signal of the user equipment. Now, the format 1A or format 1C bearing the PDSCH is sent in a public or dedicated search space.

The configuration information of aperiodically sending the sounding reference signal carried by the PDSCH includes one or more of the following information: cyclic shift information, a frequency domain location, a bandwidth, an uplink component carrier index, a location of a frequency comb, a mode indication of sending the sounding reference signal and the number of sending times.

The mode of aperiodically sending the sounding reference signal comprises one or more of the following items: sending the aperiodic sounding reference signal in the last OFDM symbol of the uplink subframe; sending the aperiodic sounding reference signal in the last but one OFDM symbol of the uplink subframe; not precoding a DMRS of the first time slot of the uplink subframe and/or a DMRS of the second time slot of the uplink subframe; sending the aperiodic sounding reference signal in the last one and/or the last but one OFDM symbol of the uplink subframe, and wherein, a sending bandwidth equals to a bandwidth occupied by a PUSCH of the user equipment, and a frequency domain location of sending is the same as a frequency domain location of the PUSCH; and sending the SRS in the DMRS of the first time slot of the uplink subframe and the DMRS of the second time slot of the uplink subframe at the same time, and performing a code division multiplexing to the sent SRS and an uplink demodulation reference signal by adopting an orthogonal cover code.

In step 102, the user equipment blindly detects the format 1A or format 1C in the search space, and judges whether needing to aperiodically send the SRS according to the bore scheduled information; if yes, then step 103 is executed, otherwise, step 104 is executed;

specifically, when scrambling the CRC by using the public RNTI, the user equipment blindly detects the format 1A or format 1C scrambled by using the public RNTI on the corresponding search space; when detecting the format 1A or format 1C, according to the PDSCH scheduled information born therein, the PDSCH is obtained in a corresponding location; and whether containing RNTI information dedicated by the user equipment is searched in a transport block born by the PDSCH, and if containing the RNTI dedicated by the user equipment, then it is judged that aperiodically sending the sounding reference signal is required.

When scrambling the CRC by using the user dedicated RNTI, if the user equipment blindly detects the format 1A or format 1C scrambled by using the user dedicated RNTI on the corresponding search space, then it is judged that aperiodically sending the sounding reference signal is required.

When the configuration information contains one uplink component carrier index, an uplink component carrier of the user equipment aperiodically sending the sounding reference signal is an uplink component carrier corresponding to the uplink component carrier index; when the configuration information does not contain the uplink component carrier index, an uplink component carrier of the user equipment aperiodically sending the sounding reference signal is an uplink component carrier corresponding to a downlink component carrier where the PDSCH bearing the configuration information locates, or is an uplink component carrier indicated by a high layers signaling or other downlink control information format; and when the configuration information contains a plurality of uplink component carrier indexes, an uplink component carrier of the user equipment aperiodically sending the sounding reference signal is an uplink component carrier corresponding to a downlink component carrier where the PDSCH bearing the configuration information locates, or is a plurality of uplink component carriers corresponding to a plurality of uplink component carrier indexes, that is, sending the sounding reference signal aperiodically on a plurality of uplink component carriers.

In step 103, the user equipment aperiodically sends the SRS according to the corresponding configuration information;

if the user equipment determines to send the SRS by adopting the mode of not precoding the DMRS of the first time slot and/or the DMRS of the second time slot according to the indication of the configuration information, the user equipment does not perform the precoding to the DMRS of the corresponding time slot (at the time, it is equivalent to send the SRS at that symbol location); and if the user equipment determines to adopt the mode of sending the SRS on the DMRS of the first time slot and the DMRS of the second time slot at the same time according to the indication of the configuration information, the user equipment adopts the orthogonal cover code to perform the code division multiplexing to the sent SRS and the uplink demodulation reference signal. The orthogonal cover code is: [+1, +1] or [+1, −1].

In step 104, it continues to blindly detect the data of the next subframe.

Embodiment 2

Figure 6:
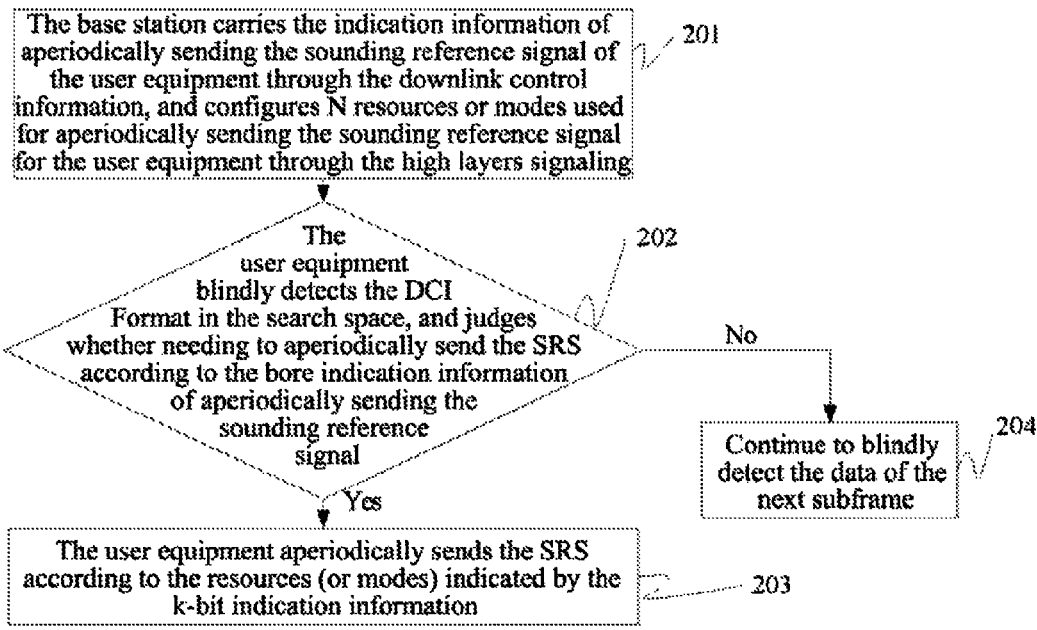
FIG. 6 is a flow chart corresponding to a method embodiment 2 of the present invention.

As shown in FIG. 6, the following steps are included.

In step 201, the base station carries an indication information of aperiodically sending the sounding reference signal of the user equipment through a downlink control information, and configures N resources or ways used for aperiodically sending the sounding reference signal for the user equipment through a high layers signaling;

specifically, for each equipment, when the user equipment occupies one uplink component carrier, k-bit is used to represent the indication information of aperiodically sending the sounding reference signal in the downlink control information, wherein the indication information indicates whether the equipment needs to aperiodically send the sounding reference signal on the corresponding uplink component carrier and which one of the N resources (or ways) is used to perform the sending; and when the user equipment occupies a plurality of (such as, L) uplink component carriers, it can, but not limit to, adopt the following way to indicate the resource (or way) of sending the SRS on each uplink component carrier:

(a) the indication information of aperiodically sending the sounding reference signal is represented by k-bit, and for each uplink component carrier, aperiodically sending the SRS is performed according to the indication of the k-bit, that is, it is judged whether needing to aperiodically send the sounding reference signal and which one of the N resources (or ways) is used to perform the sending according to its indication. (b) for each uplink component carrier, different indication information is used to indicate respectively, and each indication information is represented by a k-bit signaling, that is, L k-bits are required to indicate the indication information of the user equipment aperiodically sending the sounding reference signal; for example, the first k-bit indicates whether the present user equipment needs to aperiodically send the SRS on the first uplink component carrier and which one of the N resources (or ways) is used to perform the sending, and the second k-bit indicates whether the present user equipment needs to aperiodically send the SRS on the second uplink component carrier and which one of the N resources (or ways) is used to perform the sending, the rest can be done in the same manner.

$k=\mathrm{ceil}(\log_2(N+1))$, and the ceil represents rounded up.

The above-mentioned indication information of aperiodically sending the sounding reference signal is born in a user dedicated DCI Format domain, or born in a DCI Format domain dedicated to bearing aperiodic sounding reference signal information.

When the indication information of aperiodically sending the sounding reference signal is born in the user dedicated DCI Format domain, a CRC of the DCI Format is scrambled by using the user dedicated RNTI;

when the indication information of aperiodically sending the sounding reference signal is born in the DCI Format domain dedicated for bearing the aperiodic sounding reference signal information, if the DCI Format contains the indication information of aperiodically sending the sounding reference signals of a plurality of user equipments, then a CRC of the DCI Format is scrambled by using a user public RNTI;

and if the DCI Format only contains the indication information of aperiodically sending the sounding reference signal of one user equipment, then a cyclic redundancy check (CRC) of the DCI Format is scrambled by using a user public RNTI or dedicated RNTI.

When the DCI Format dedicated for bearing the aperiodic sounding reference signal information is adopted to bear the indication information of aperiodically sending the sounding reference signals of a plurality of equipments, an arranging sequence or an initial location of the indication information of aperiodically sending the sounding reference signals of a plurality of user equipments is configured and sent through the high layers signaling.

The base station sending down the high layers signaling indication can be used for the N resources (or ways) of aperiodically sending the sounding reference signal, each resource (or way) includes one or more of the following information: the cyclic shift information, the frequency domain location, the user dedicated bandwidth, the location of the frequency comb, the SRS bandwidth configuration information, the SRS sending subframe or periodic configuration information, and the mode indication of sending the sounding reference signal, etc.

The mode of aperiodically sending the sounding reference signal comprises one or more of the following items: sending the aperiodic sounding reference signal in the last OFDM symbol of the uplink subframe; sending the aperiodic sounding reference signal in the last but one OFDM symbol of the uplink subframe; not precoding a DMRS of the first time slot of the uplink subframe and/or a DMRS of the second time slot of the uplink subframe; sending the aperiodic sounding reference signal in the last one and/or the last but one OFDM symbol of the uplink subframe, and wherein, a sending bandwidth equals to a bandwidth occupied by a PUSCH of the user equipment, and a frequency domain location of sending is the same as a frequency domain location of the PUSCH; and sending the SRS in the DMRS of the first time slot of the uplink subframe and the DMRS of the second time slot of the uplink subframe at the same time, and performing a code division multiplexing to the sent SRS and an uplink demodulation reference signal by adopting an orthogonal cover code.

In step 202, the user equipment blindly detects the DCI Format in the search space, and judges whether needing to aperiodically send the SRS according to the bore indication information of aperiodically sending the sounding reference signal; if yes, then step 203 is executed, otherwise, step 204 is executed;

specifically, when bearing the indication information of aperiodically sending the sounding reference signal by adopting the user dedicated DCI Format domain, the user equipment blindly detects the DCI Format scrambled by using the dedicated RNTI in the corresponding search space and judges whether needing to aperiodically send the SRS and which one of the N resources (or ways) is used to perform the sending according to the bore indication information therein.

When bearing the indication information of aperiodically sending the sounding reference signal by adopting the DCI Format dedicated for bearing the aperiodic sounding reference signal, the user equipment blindly detects the DCI Format scrambled by using the public RNTI in the corresponding search space, searches the indication information of the corresponding location in the DCI Format according to the high layers signaling, and judges whether needing to aperiodically send the SRS and which one of the N resources (or ways) is used to perform the sending according to that indication information.

In step 203, the user equipment aperiodically sends the SRS according to the resource (or way) indicated by the indication information;

when the indication information of aperiodically sending the sounding reference signal of a same user equipment is born in the user dedicated DCI Format and the DCI Format dedicated for bearing the aperiodic sounding reference signal information in one subframe, the indication information born in the user dedicated DCI Format and the indication information born in the DCI Format dedicated for bearing the aperiodic sounding reference signal information are configured as the same value; the user equipment analyzes the indication information of aperiodically sending the sounding reference signal born in the user dedicated DCI Format, and when the indication information of aperiodically sending the sounding reference signal born in the user dedicated DCI Format cannot be analyzed correctly, then the user equipment analyzes the indication information of aperiodically sending the sounding reference signal born in the DCI Format dedicated for bearing the aperiodic sounding reference signal information.

The user dedicated DCI Format includes the user dedicated DCI Format used for uplink scheduling and the user dedicated DCI Format used for downlink allocation;

when the indication information of aperiodically sending the sounding reference signal of a same user equipment is born in the user dedicated DCI Format used for uplink scheduling and the user dedicated DCI Format used for downlink allocation in one subframe, the user equipment analyzes the indication information of aperiodically sending the sounding reference signal of the user equipment born by any one of the user dedicated DCI Formats.

When the user equipment occupies a plurality of (such as L) uplink component carriers, the location of the uplink component carrier of aperiodically sending the SRS can be determined according to the following modes:

mode 1, the uplink component carrier is determined by a public RNTI and an initial location, wherein, different uplink component carriers correspond to different public RNTIs or initial locations;

mode 2, the uplink component carrier is an uplink component carrier corresponding to a downlink component carrier where the PDSCH scheduled by the DCI format bearing the indication information locates, or, an uplink component carrier where the PUSCH scheduled by the DCI format bearing the indication information locates, or, an uplink component carrier corresponding to a downlink component carrier bearing the indication information;

mode 3, the uplink component carrier corresponding to the downlink component carrier is configured by a system information block, such as SIB 2, or is configured by the high layers signaling.

The resources (or ways) used when sending the SRS in each uplink component carrier can be determined according to the indication information and in accordance with the way described in step 201.

If the user equipment determines to send the SRS by adopting the mode of not precoding the DMRS of the first time slot and/or the DMRS of the second time slot according to the indication of the downlink control information, the user equipment does not perform the precoding to the DMRS of the corresponding time slot (at the time, it is equivalent to send the SRS at that symbol location); and if the user equipment determines to adopt the mode of sending the SRS on the DMRS of the first time slot and the DMRS of the second time slot at the same time according to the indication of the downlink control information, the user equipment adopts the orthogonal cover code to perform the code division multiplexing to the sent SRS and the uplink demodulation reference signal. The orthogonal cover code is: [+1, +1] or [+1, −1].

In step 204, it continues to blindly detect the data of the next subframe.

Embodiment 3

Figure 7:
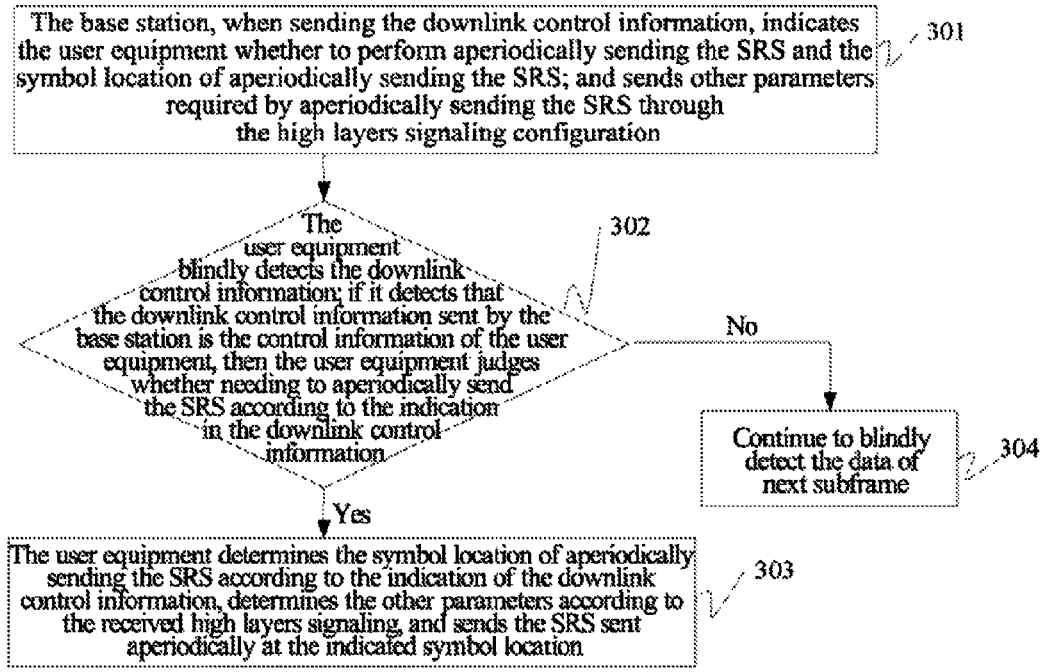
FIG. 7 is a flow chart corresponding to a method embodiment 3 of the present invention.

As shown in FIG. 7, the following steps are included.

In step 301, the base station, when sending a downlink control information, indicates the user equipment whether to perform aperiodically sending the SRS and a mode of aperiodically sending the SRS; and configures and sends other parameters required by aperiodically sending the SRS through a high layers signaling.

Specifically, the way of indicating the user equipment whether to perform aperiodically sending the SRS and the mode of aperiodically sending the SRS through the downlink control information can be, but not limit to, the following two kinds:

(1) the user equipment is indicated whether needing to aperiodically send the SRS by using 1-bit; for example, when the value of the 1-bit is 1 (or 0), it represents that aperiodically sending the SRS is required, and when the value of the 1-bit is 0 (or 1), it represents that there is no need to aperiodically send the SRS;

supposing that the number of modes used for aperiodically sending the sounding reference signal in one uplink subframe is T, the mode of aperiodically sending the sounding reference signal is indicated by using n-bit.

(2) supposing that the number of modes used for aperiodically sending the sounding reference signal in one uplink subframe is T, the user equipment is indicated whether needing to perform aperiodically sending the SRS and a mode of aperiodically sending the SRS by using m-bit;

the mode of aperiodically sending the sounding reference signal comprises one or more of the following items: sending the aperiodic sounding reference signal in the last OFDM symbol of the uplink subframe; sending the aperiodic sounding reference signal in the last but one OFDM symbol of the uplink subframe; not precoding a DMRS of the first time slot of the uplink subframe and/or a DMRS of the second time slot of the uplink subframe; sending the aperiodic sounding reference signal in the last one and/or the last but one OFDM symbol of the uplink subframe, and wherein, a sending bandwidth equals to a bandwidth occupied by a PUSCH of the user equipment, and a frequency domain location of sending is the same as a frequency domain location of the PUSCH; and sending the SRS in the DMRS of the first time slot of the uplink subframe and the DMRS of the second time slot of the uplink subframe at the same time, and performing a code division multiplexing to the sent SRS and an uplink demodulation reference signal by adopting an orthogonal cover code.

The other parameters of aperiodically sending the sounding reference signal configured and sent by the base station through the high layer signaling include one or more of the following information: a cyclic shift information, a frequency domain location, an uplink component carrier index, a user dedicated bandwidth, a location of a frequency comb, an SRS bandwidth configuration information, an SRS sending subframe and periodic configuration information, etc.

In step 302, the user equipment blindly detects the downlink control information; if it detects that the downlink control information sent by the base station is the control information of the user equipment, then the user equipment judges whether needing to aperiodically send the SRS according to the indication in the downlink control information; if yes, then step 303 is executed, otherwise, step 304 is executed.

In step 303, the user equipment determines the mode of aperiodically sending the SRS according to the indication of the downlink control information, and determines the other parameters according to the received high layers signaling, and aperiodically sends the SRS according to the indicated mode;

if the user equipment determines to send the SRS by adopting the mode of not precoding the DMRS of the first time slot and/or the DMRS of the second time slot according to the indication of the downlink control information, the user equipment does not perform the precoding to the DMRS of the corresponding time slot (at the time, it is equivalent to send the SRS at that symbol location); and if the user equipment determines to adopt the mode of sending the SRS on the DMRS of the first time slot and the DMRS of the second time slot at the same time according to the indication of the downlink control information, the user equipment adopts the orthogonal cover code to perform the code division multiplexing to the sent SRS and the uplink demodulation reference signal. The orthogonal cover code is: [+1, +1] or [+1, −1].

In step 304, it continues to blindly detect the data of the next subframe.

Obviously, those skilled in the art should understand that each module or each step of the above-mentioned present invention can be realized with general computing device, and they can be integrated in a single computing device or distributed in a network consisting of a plurality of computing devices. Alternatively, they can be realized with the program code which can be executed by the computing device, thus, they can be stored in a storage device to be executed by the computing device; and in some cases, the shown or described steps can be executed with an order different from the order described here, or they are respectively made into each integrated circuit module or a plurality of modules or steps therein are made into a single integrated circuit module to realize. In this way, the present invention is not limited to any particular combination of the hardware and software.

It can be understood by those skilled in the art that all or part of steps in the above-mentioned method can be fulfilled by programs instructing relevant hardware, and the programs can be stored in a computer readable storage medium, such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function modules. The present invention is not limit to any specific form of the combination of the hardware and software.

The above description is only the preferred embodiments of the present invention and is not intended to limit the present invention. For those skilled in the art, the present invention can have various modifications and variations. Any modification, equivalent and/or improvement without departing from the spirit and essence of the present invention should be embodied in the scope of the present invention.

INDUSTRIAL APPLICABILITY

The present invention can realize that the user equipment aperiodically sends the SRS, which improves the utilization ratio of SRS resources and increases the flexibility of resource scheduling.

What we claim is:

1. A method for configuring user equipments (UEs) to send a sounding reference signal, comprising:

notifying user equipments, by a base station, to a-periodically send a sounding reference signal, and sending configuration information down to the UEs for the UEs to a-periodically send the sounding reference signal (SRS); wherein, sending configuration information down to the UEs further comprising:

through a downlink control information the base station carrying an indication information of the sounding reference signal for the user equipments a-periodically sending to the base station; and through a higher layers signaling the base station configuring N resources or ways for the UEs sending the sounding reference signal a-periodically;

wherein N is an integer from 1 to 20;

wherein the indication information indicates whether the user equipments needs to a-periodically send the sounding reference signal on the uplink component carrier and through which one of the N resources and ways to perform the sending;

so that the user equipments a-periodically send the sounding reference signal on an uplink component carrier according to the received indication information.

2. The method according to claim 1, wherein, each resource or way in the N resources or ways comprises one or more of the following information:

a cyclic shift information, a frequency domain location, a UE specific bandwidth, a location of a frequency comb, an SRS bandwidth configuration information, an SRS sending subframe, a periodic configuration information and a mode indication of aperiodically sending the sounding reference signal.

3. The method according to claim 2, wherein, the mode of aperiodically sending the sounding reference signal comprises one or more of the following items:

sending the aperiodic sounding reference signal in the last orthogonal frequency division multiplexing (OFDM) symbol of the uplink subframe;

sending the aperiodic sounding reference signal in the last but one OFDM symbol of the uplink subframe;

sending the aperiodic sounding reference signal by not precoding a demodulation reference signal (DMRS) of the first time slot of the uplink subframe and/or a DMRS of the second time slot of the uplink subframe;

sending the aperiodic sounding reference signal in the last one and/or the last but one OFDM symbol of the uplink subframe, and wherein, a sending bandwidth equals to a bandwidth occupied by a physical uplink shared channel (PUSCH) of the user equipment, and a frequency domain location of sending is the same as a frequency domain location of the PUSCH; and sending the aperiodic sounding reference signal in the DMRS of the first time slot of the uplink subframe and the DMRS of the second time slot of the uplink subframe at the same time, and performing a code division multiplexing to the sent sounding reference signal and an uplink demodulation reference signal by adopting an orthogonal cover code.

4. The method according to claim 1, wherein, for each user equipment, when the user equipment occupies one uplink component carrier, k-bit is used to represent the indication information of aperiodically sending the sounding reference signal in the downlink control information;

when the user equipment occupies more than one uplink component carrier, the indication information of aperiodically sending the sounding reference signal on each uplink component carrier is indicated according to any one of the following ways:

(a) k-bit is used to represent the indication information of aperiodically sending the sounding reference signal in the downlink control information, wherein the indication information indicates whether the user equipment needs to aperiodically send the sounding reference signal and which one of the N resources or ways is used to perform the sending, so that when aperiodically sending the sounding reference signal on each uplink component carrier, the aperiodically sending the sounding reference signal on each uplink component carrier is performed according to the indication information of k-bit;

(b) for each uplink component carrier, different indication information is used to indicate respectively, and each indication information is represented by a k-bit signaling, wherein the k-bit signaling indicates whether the user equipment needs to aperiodically send the sounding reference signal on the corresponding uplink component carrier and which one of the N resources or ways is used to perform the sending;

wherein, k is an integer from 1 to 6.

5. The method according to claim 4, wherein, a relationship between k and N is: $k=\text{ceil}(\log_2(N+1))$, and the ceil represents rounded up.

6. The method according to claim 4, wherein, the indication information of aperiodically sending the sounding reference signal is carried on the UE specific downlink control information format (DCI Format) domain, or carried on a DCI Format domain dedicated to carry aperiodic sounding reference signal information.

7. The method according to claim 6, further comprising:

when the indication information of aperiodically sending the sounding reference signal of a same user equipment is carried on the UE specific DCI Format and the DCI Format dedicated to carry the aperiodic sounding reference signal information in one subframe, the user equipment interpreting the indication information of aperiodically sending the sounding reference signal carried on the UE specific DCI Format.

8. The method according to claim 7, wherein, the UE specific DCI Format comprises the UE specific DCI Format used for uplink scheduling and the UE specific DCI Format used for downlink allocation;

when the indication information of aperiodically sending the sounding reference signal of a same user equipment is carried on the UE specific DCI Format used for uplink scheduling and the UE specific DCI Format used for downlink allocation in one subframe, the user equipment interprets the indication information of aperiodically sending the sounding reference signal of the user equipment carried by any one of the UE specific DCI Formats.

9. The method according to claim 4, wherein, the uplink component carrier is determined by the public RNTI and the initial location, wherein, different uplink component carriers correspond to different public RNTIs or initial locations.

10. The method according to claim 4, wherein, the uplink component carrier is an uplink component carrier corresponding to a downlink component carrier where the PDSCH scheduled by the DCI format carrying the indication information locates, or, an uplink component carrier where the PUSCH scheduled by the DCI format carrying the indication information locates, or, an uplink component carrier corresponding to a downlink component carrier carrying the indication information.

11. A base station, comprising: a memory storing instructions, and a processor which upon executing the instructions performs the following:
notifying user equipments to a-periodically send sounding reference signal, and sending configuration information down to the UEs for the UEs to a-periodically send the sounding reference signal; wherein, sending configuration information down to the UEs further comprising:
through a downlink control information the base station carrying an indication information of the sounding reference signal for the user equipments a-periodically sending to the base station; and through a higher layers signaling the base station configuring N resources or ways for the UEs sending the sounding reference signal a-periodically;
wherein N is an integer from 1 to 20;
wherein the indication information indicates whether the user equipments needs to a-periodically send the sounding reference signal on the uplink component carrier and through which one of the N resources and ways to perform the sending;
so that the user equipments a-periodically send the sounding reference signal on an uplink component carrier according to the received indication information.

12. The base station according to claim 11, wherein,
each resource or way in the N resources or ways comprises one or more of the following information:
a cyclic shift information, a frequency domain location, a UE specific bandwidth, a location of a frequency comb, an SRS bandwidth configuration information, an SRS sending subframe, a periodic configuration information and a mode indication of aperiodically sending the sounding reference signal.

13. The base station according to claim 11, wherein,
for each user equipment, when the user equipment occupies one uplink component carrier, k-bit is used to represent the indication information of aperiodically sending the sounding reference signal in the downlink control information, wherein the indication information indicates whether the user equipment needs to aperiodically send the sounding reference signal on the uplink component carrier and which one of the N resources and ways is used to perform the sending;
when the user equipment occupies more than one uplink component carrier, the indication information of aperiodically sending the sounding reference signal on each uplink component carrier is indicated according to any one of the following ways:
(a) k-bit is used to represent the indication information of aperiodically sending the sounding reference signal in the downlink control information, wherein the indication information indicates whether the user equipment needs to aperiodically send the sounding reference signal and which one of the N resources or ways is used to perform the sending, so that when aperiodically sending the sounding reference signal on each uplink component carrier, the aperiodically sending the sounding reference signal on each uplink component carrier is performed according to the indication information of k-bit;
(b) for each uplink component carrier, different indication information is used to indicate respectively, and each indication information is represented by a k-bit signaling, wherein the k-bit signaling indicates whether the user equipment needs to aperiodically send the sounding reference signal on the corresponding uplink component carrier and which one of the N resources or ways is used to perform the sending;
wherein, k is an integer from 1 to 6; and
a relationship between k and N is: $k=\mathrm{ceil}(\log_2(N+1))$, and the ceil represents rounded up.

14. The base station according to claim 13, wherein,
the indication information of aperiodically sending the sounding reference signal is carried on the UE specific downlink control information format (DCI Format) domain, or carried on a DCI Format domain dedicated to carry aperiodic sounding reference signal information.

15. A user equipment, comprising a memory storing instructions, and a processor which upon executing the instructions performs the following:
receiving a notification of a-periodically sending sounding reference signal sent by a base station;
receiving configuration information sent by the base station for the UEs to a-periodically send the sounding reference signal; wherein, receiving configuration information sent by the base station further comprising:
through a downlink control information the base station carrying an indication information of the sounding reference signal for the user equipments a-periodically sending to the base station; through a higher layers signaling the base station configuring N resources or ways for the UEs sending the sounding reference signal a-periodically, wherein N is an integer from 1 to 20; and the user equipment receiving the indication information and the N resources or ways;
wherein the indication information indicates whether the user equipments needs to a-periodically send the sounding reference signal on the uplink component carrier and through which one of the N resources and ways to perform the sending; and
a-periodically sending the sounding reference signal on an uplink component carrier according to the received indication information.

16. The user equipment according to claim 15, wherein,
each resource or way in the N resources or ways comprises one or more of the following information:
a cyclic shift information, a frequency domain location, a UE specific bandwidth, a location of a frequency comb, an SRS bandwidth configuration information, an SRS sending subframe, a periodic configuration information and a mode indication of aperiodically sending the sounding reference signal.

* * * * *